United States Patent [19]

Reilly

[11] Patent Number: 5,129,305
[45] Date of Patent: Jul. 14, 1992

[54] PENETRATING ASSAULT WEAPONS

[76] Inventor: Hugh T. Reilly, 425 Delaware Ave., Elkton, Md. 21921

[21] Appl. No.: 548,269

[22] Filed: Jul. 3, 1990

[51] Int. Cl.⁵ .................. F42B 12/44; F42B 12/46
[52] U.S. Cl. ........................... 89/1.11; 89/1.1; 102/364
[58] Field of Search ............ 89/5, 1.11, 1.1; 102/371, 399, 476, 364

[56] References Cited

U.S. PATENT DOCUMENTS

| 478,215 | 2/1892 | Berdan | 89/5 |
|---|---|---|---|
| 763,147 | 6/1904 | Brown | 102/371 |
| 1,131,761 | 3/1915 | Wheaton | 89/5 |
| 3,109,373 | 11/1963 | Saffer | 102/399 |
| 3,713,636 | 1/1973 | Helms et al. | 266/71 |
| 3,724,372 | 4/1973 | Phillips | 102/364 |
| 3,785,631 | 1/1974 | Prye | 266/71 |
| 4,112,846 | 9/1978 | Gilbert et al. | 102/364 |
| 4,173,931 | 11/1979 | Schiessl et al. | 102/364 |
| 4,353,303 | 10/1982 | Bell | 102/364 |
| 4,447,952 | 5/1984 | Elkins | 210/650 |
| 4,955,939 | 9/1990 | Petrovsky et al. | 102/476 |

FOREIGN PATENT DOCUMENTS 459528  9/1949  Canada .................. 105/501

OTHER PUBLICATIONS

Browne, "Plastics and Ceramics Replace Steel as the Sinews of War," *New York Times*, Jul. 18, 1989, pp. C1, 11.

Fialka, "The Long Search for a Better Bazooka Frustrates Military," *The Wall Street Journal*, May 2, 1989, p. 1, col. 4, and p. 8.

*Primary Examiner*—David H. Brown
*Attorney, Agent, or Firm*—James K. Poole

[57] ABSTRACT

An assault weapon for penetrating enclosed targets includes means for fastening the weapon to the surface of the target while it is penetrated by non-explosive penetration means such as a thermal lance. Once the target is penetrated, offensive agents can be introduced. In one embodiment, the fastening means and penetration means can be combined in the form of a hollow bayonet which penetrates the surface of unarmored targets on impact.

9 Claims, 8 Drawing Sheets

PENETRATING ASSAULT WEAPONS

BACKGROUND OF THE INVENTION

1. Field of the Invention

This invention relates to the field of assault weapons and other projectiles suitable for penetration of both armored and unarmored targets such as military vehicles.

2. Description of Prior Art

From the days of sword and shield to the present, the history of warfare has been a competition between assault weapons and armor. As more powerful and sophisticated projectiles have been created, armor systems have begun to employ reinforced plastics, ceramics and even strategically placed empty space in addition to or in lieu of conventional metallic armor. See, e.g., Browne, "Plastics and Ceramics Replace Steel as the Sinews of War" *New York Times*, July 18, 1989—p. Cl, 11.

Anti-armor projectiles can be classified in three general categories: those employing solid penetrators, usually driven by mass/velocity consideration (HEP—high energy penetrator); those employing shaped charges to generate a high velocity rod formed by the explosive collapse of a metallic cone for penetration (HEAT—high explosive anti-tank) and those employing a different shaped explosive charge to promote spalling on the inside of the armor (HESH—high explosive squash head). A subcategory of the solid penetrators also exists whereby incendiary materials are placed in combination with the penetrator to burn during penetration and after breaching the armor. These weapons are generally dependent upon achieving their penetrating and explosive effects more or less instantaneously with impact with the target. However, the need is apparent for more persistent weapons which are capable of penetrating armor of great thickness and/or novel designs to inactivate targets by combustion, chemical agents or the like. See, e.g., Fialka, "The Long Search For a Better Bazooka Frustrates Military," *The Wall Street Journal*, May 2, 1989—p, 1 col 4.

U.S. Pat. No. 3,724,372 discloses a solid combustible cutter for underwater or land use having legs and flange portions (45) adapted for attachment by any suitable means, e.g. such as stud gun connectors, underwater adhesive means, magnetic feet or screw connectors. U.S. Pat. No. 4,447,952 discloses an underwater cutting or penetrating device using an explosively driven member, having magnetic attachment means for the apparatus driving the member.

U.S. Pat. No. 3,713,636 discloses a solid combustible underwater torch having work clamping means. U.S. Pat. No. 4,112,846 discloses an armor piercing incendiary projectile. Upon impact, the incendiary burns the armor to allow the projectile to penetrate more easily. U.S. Pat. No. 3,588,303 discloses a support for a plurality of self-consuming thermal lances for simultaneously burning openings in building walls or the like.

However, none of these patents disclose a launchable device which can fasten itself temporarily to a target upon impact and remain attached for a time sufficient to penetrate the target by non-explosive means.

SUMMARY OF THE INVENTION

It is an object of this invention to provide an armor-piercing projectile which can penetrate thick armor by burning through and enhancing combustion within the target's armor shell after the armor has been breached.

Another object of this invention is to provide an improved armor-piercing projectile for use against petroleum storage vessels and the like by causing internal ignition of petroleum products and subsequent explosion on contact with the materials emitted by the projectile.

Another object is to provide a series of projectiles to deal with targets having walls or armor of various thicknesses and to incorporate other materials in reservoirs for injection into the spaces behind the target surface after penetration of the target walls or armor. Such chemical agents as CS and CN, combustibles such as napalm and inflammable oils, incendiaries such as the thermites, powdered aluminum or magnesium with oxidizers and others, fuel air explosive materials such as ethylene oxide, acetylene, propane and others, and liquid explosives of various formulations would be suitable for injection.

Another object is to provide a family of anti-armor mines to pierce armor by burning, igniting materials within the armor and injecting various materials such as anti-personnel substances, combustibles and explosive materials after penetration.

Other objects and advantages of the invention will become apparent on reference to the following detailed description, the drawings and the claims appended hereto.

The invention involves a novel concept providing self-contained means of penetrating armor and it does not rely on explosives for effectiveness. In an embodiment employing a thermal lance, it provides hot oxygen or other oxidizing agents capable of spontaneously igniting materials inside the target after the armor is breached. Other materials such as offensive agents can be injected from reservoirs as required by the mission. In an embodiment employing a hollow bayonet, which pierces the target, materials are injected directly through the bayonet as required.

In accordance with the present invention, a launchable assault weapon is provided for penetrating enclosed targets, comprising fastening means, non-explosive penetration means and injection means. The fastening means can be any suitable means (as described in detail below) which are effective to fasten the weapon to the target for a time sufficient to penetrate the target, introduce an offensive agent into the target, or the like. The fastening means preferably actuate on impact or contact with the target surface. For example, in a preferred embodiment the fastening means comprise impact-actuated cartridge-driven studs which penetrate the target's surface to fasten the weapon firmly to the target surface. In another preferred embodiment, the flow path of an oxidant which is provided to certain penetrating means is so directed that in flowing the oxidant exerts a force upon the thermal lance, helping to retain it in position against the target surface.

In an embodiment adapted for use against armored targets, the penetrating means include a thermal lance such as the so-called "burning bar", typically a ferrous tube containing a plurality of wires or rods of ferrous metal, optionally including a minor portion of aluminum wires or rods. The weapon includes an oxidant source, means to feed the oxidant to the thermal lance, means to trigger the flow of the oxidant and igniter means to ignite the thermal lance as the oxidant begins to flow. The trigger means for oxidant flow and the igniter means can be impact-actuated, or actuated by any suitable means if the weapon is not to be launched against the target.

In another embodiment, the weapon comprises combined fastening means and penetration means comprising a hollow bayonet adapted to pierce the surface of a target (typically unarmored or lightly armored), and is adapted for the introduction of an offensive agent through the hollow bayonet into the target by the inclusion of a source of the agent, flow control means and impact-actuated trigger means to commence the flow of the agent.

The weapons of the present invention are designed and adapted to be employed in a variety of environments ranging from undersea to outer space, including the earth's atmosphere and areas above the earth's stratosphere. The skin and other components of the weapon need only be protected against liquids, high pressure, high vacuum or other adverse influences by any suitable means known to those skilled in the relevant art. The weapons can be placed against the surface of a target to actuate certain fastening means, with the penetrating means being actuated later by timing means or remote means. However, the preferred embodiments are launchable, with the fastening means and penetrating means being impact-actuated. Any launching means suitable to the environment can be used, including torpedoes or other underwater propulsion units; the force of gravity, physical means such as catapults, slings and the like. Compressed gases or chemical propellants and rockets can be used in earth's atmosphere as well as outer space. The launching and propulsion means need only be adapted to direct the weapon to the target with sufficient impact to actuate the fastening and penetration means (which with the bayonet embodiment requires sufficient force to penetrate the surface or skin of the target) without damaging or inactivating the weapon assembly. Thus, for certain launching and propulsion means, it may be appropriate to include braking means such as parachutes, retrorockets, energy-absorbing components of the weapon body or the like to ensure that the weapon does not contact the target surface with excessive force.

BRIEF DESCRIPTION OF THE DRAWINGS

These and other objects of the present invention will be better understood upon perusal of the following detailed description, including the drawing, in which.

DETAILED DESCRIPTION OF THE INVENTION

Referring now to FIGS. 1 to 6 for the anti-armor case, the projectile body (100) includes a cylindrical reservoir (2) filled with oxidant such as oxygen or nitrogen dioxide in gaseous or liquid form respectively, or a solid mixture capable of generating oxygen or other oxidant such as chlorine in the thermal lance case. The reservoir is filled through filler (24). Any suitable oxidant or oxidant generator can be used which will produce a gaseous or vaporized oxidant with oxidizing effect approximately equivalent to at least an 80 volume percent mixture of oxygen in nitrogen. For example, halogens including chlorine, bromine, fluorine and iodine can be used, as well as oxyhalo compounds such as oxychlorine trifluoride ($OF_3Cl$). In addition to solid generators of oxygen which are well known in the art, hydrogen peroxide can be catalytically decomposed to produce oxygen (and water). Oxygen is generally preferred due to its ready availability and lack of the environmental problems that may be caused by some halogens or nitrogen oxides. The oxidant should be delivered to the tube at a pressure in the range of from about 10 to about 60 psig, preferably from about 15 to about 40 psig.

Figure 1:
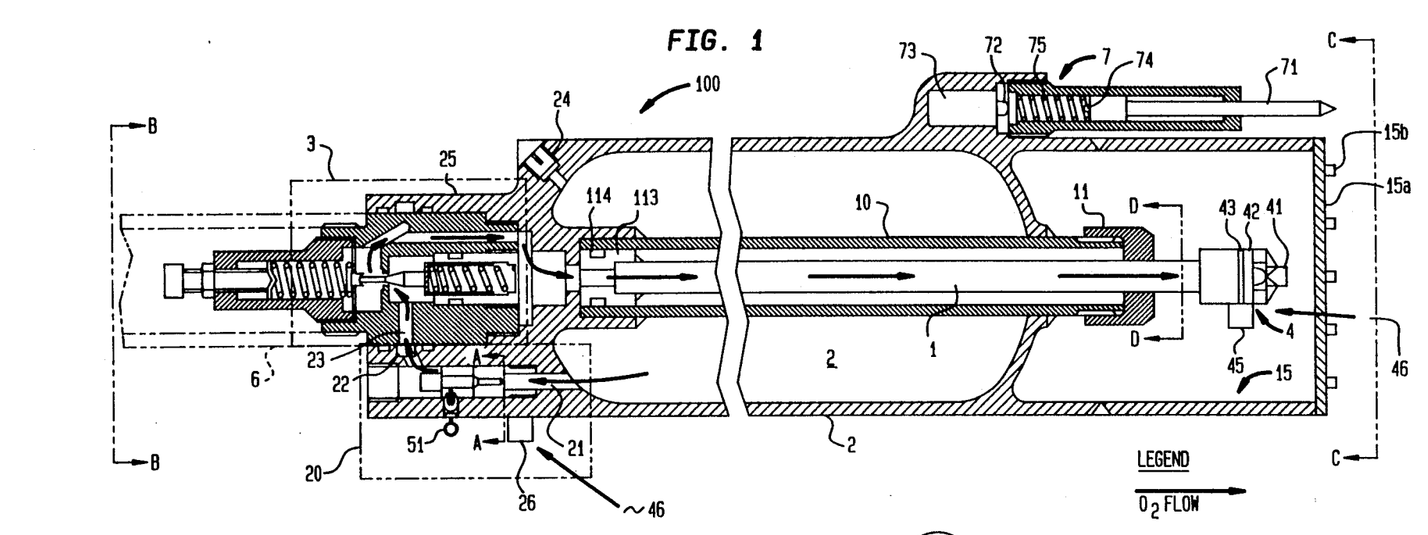
FIG. 1 is a sectional elevation view of an armor-piercing weapon of the invention with end views showing the cartridge driven studs (FIG. 1C) and the mounting surface for the fins (FIG. 1B) and sectional views of the thermal lance (FIG. 1D) and the oxygen release striker assembly (FIG. 1A), with arrows showing oxygen flow after the weapon is actuate.
Figure 1A:
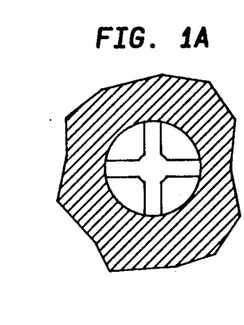
Figure 1B:
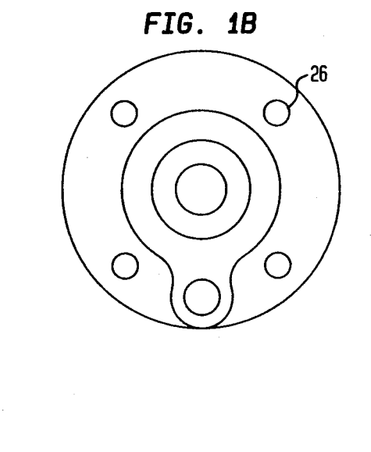
Figure 1C:
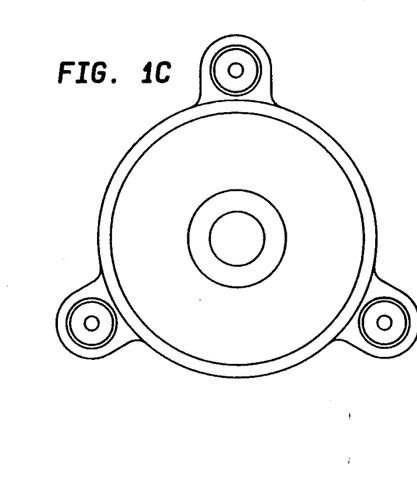
Figure 1D:
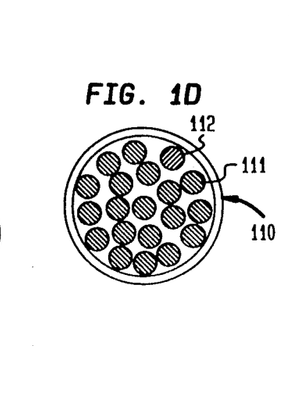
Figure 1E:
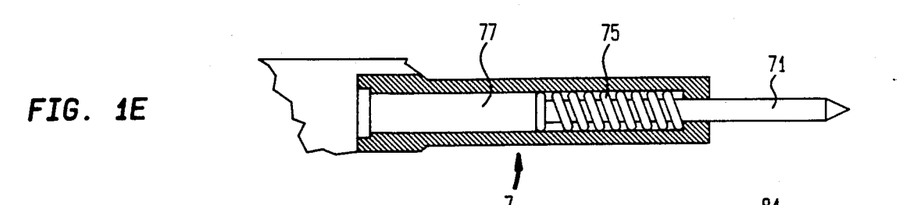
FIGS. 1E and 1F illustrate inertially-actuated studs and magnetic fastening means, respectively.

The cylindrical reservoirs center houses in housing (10) a thermal lance (1) comprising a steel pipe or tube (110) filled with a plurality of steel rods (111) and usually at least one aluminum rod (112) to enhance ignition, as shown in FIG. 1D. Typically, the rods used in a ½ inch pipe or tube are 12 to 22 in number, the diameters of which are consistent with ease of fabrication. It is understood that any suitable ferrous metal or alloy can be used for the tube, steel being representative of suitable iron alloys which are effective. Steel is also readily available from commercial or industrial sources. The rods or wires can be of similar materials, and given a suitable igniter can readily be ignited in the presence of the oxidant. However, it is preferred that the lance also contain at least one rod containing at least one easily or readily ignitable metal such as aluminum, magnesium, silicon, boron, or the like, including alloys or mixtures thereof. Such materials have low ignition temperatures, and thus are readily ignited by an igniter in the presence of oxygen, providing faster and more certain ignition for the ferrous rods. The lance (1) is centered in housing (10) by bushing (11) and base (113) which fits slidably into the housing and is sealed gas-tight by 0-ring (114). Thus, when the oxidant is released and flows as shown by arrows in FIG. 1, the lance is extended and driven forward by gas pressure on the base.

Figure 3A:
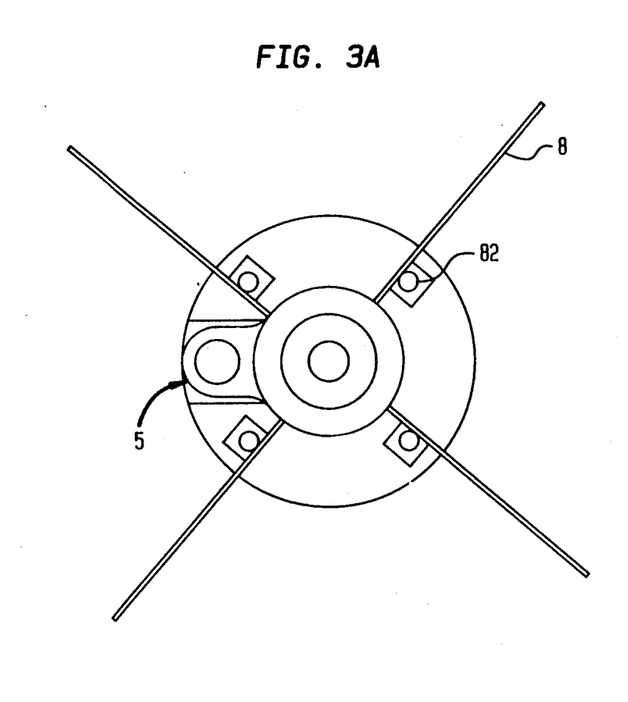
FIGS. 3A and 3B are end and elevation views of the weapon's fixed stabilizing fins.
Figure 3B:
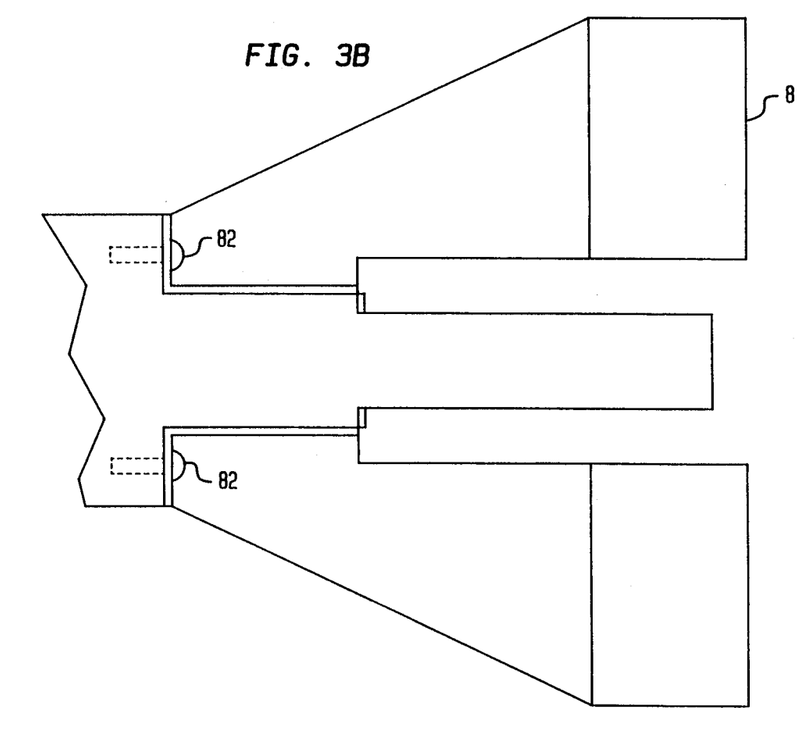
Figure 3C:
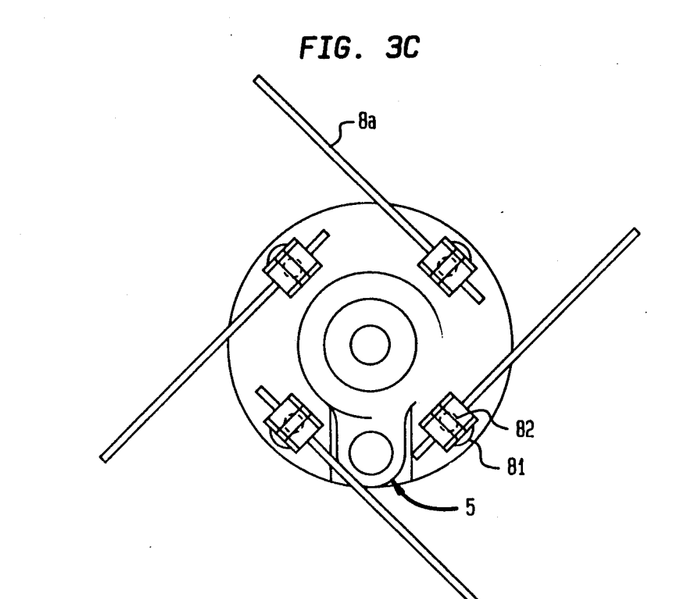
FIGS. 3C and 3D are end and elevation views of the weapon's folding stabilizing fins.
Figure 3D:
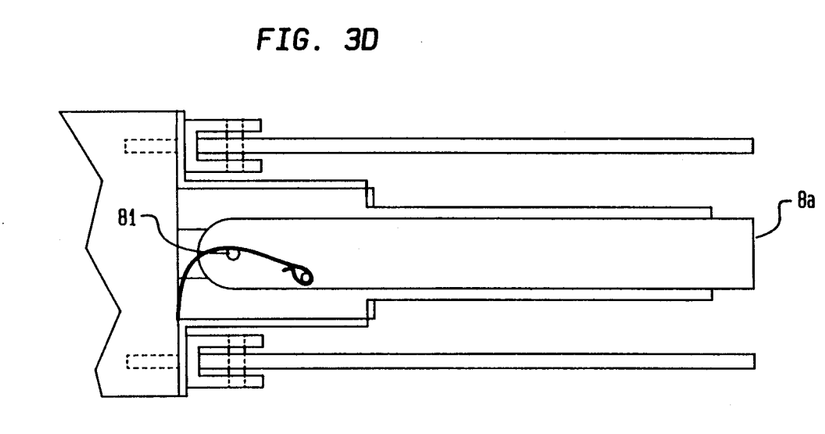

The design shown in FIG. 1 is fitted with a 40 mm spigot (6) for firing from a shoulder weapon such as an M-79 grenade launcher or M-203 grenade launcher. This design can be fitted with folding (8a) or wrap-around (8b) fins as well as fixed stabilizing fins (8), as shown in FIGS. 3C/3D, 3E/3F and 3A/3B, respectively. The folding fins of FIGS. 3C/3D can be conventional units such as used in existing weapons such as 2.75 inch aircraft rockets, and rotate about pivot/securing means (81) between open (or extended) and stowed positions. In FIGS. 3C and 3D, respectively, the fins (8a) are shown in the open and stowed positions. The figures of the FIG. 3 series also show an end view of the oxygen release striker assembly (5).

Figure 3E:
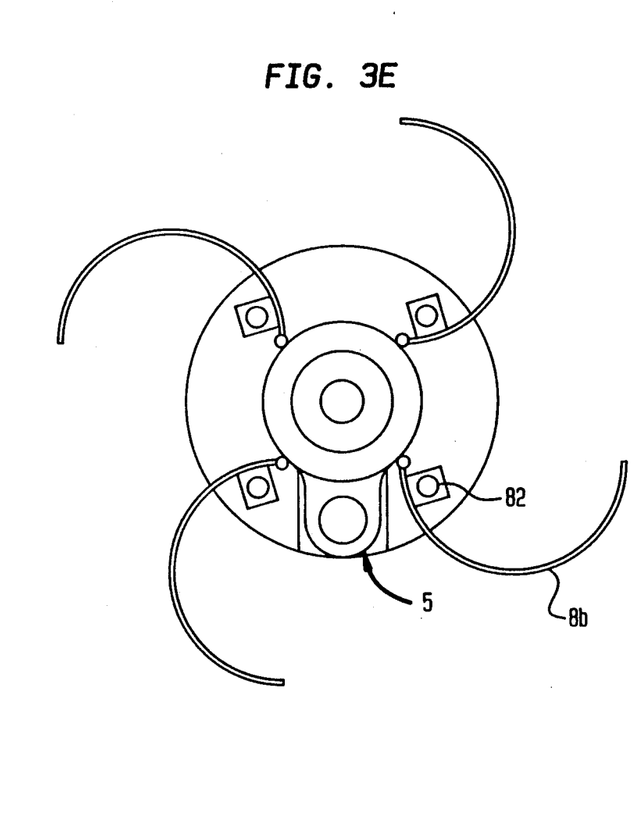
FIGS. 3E and 3F are end and elevation views of the weapon's wrap type stabilizing fins.
Figure 3F:
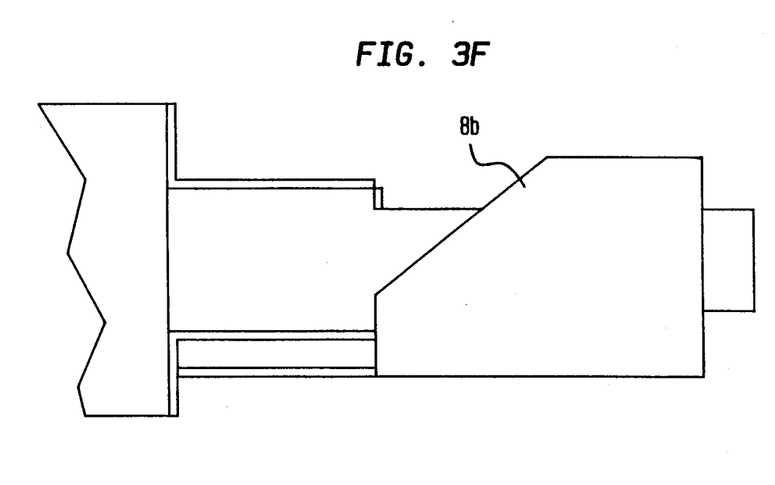

In FIGS. 3E/3F, wraparound fins (8b) are shown in the extended (3E) and closed (3F) positions. The extended fins are moved into position and held there by springs mounted in the hinges (not shown). These fins and the conventional fixed fins (8) of FIGS. 3A and 3B are held in place by bolts, pins or other suitable mechanical means (82).

Figure 4:
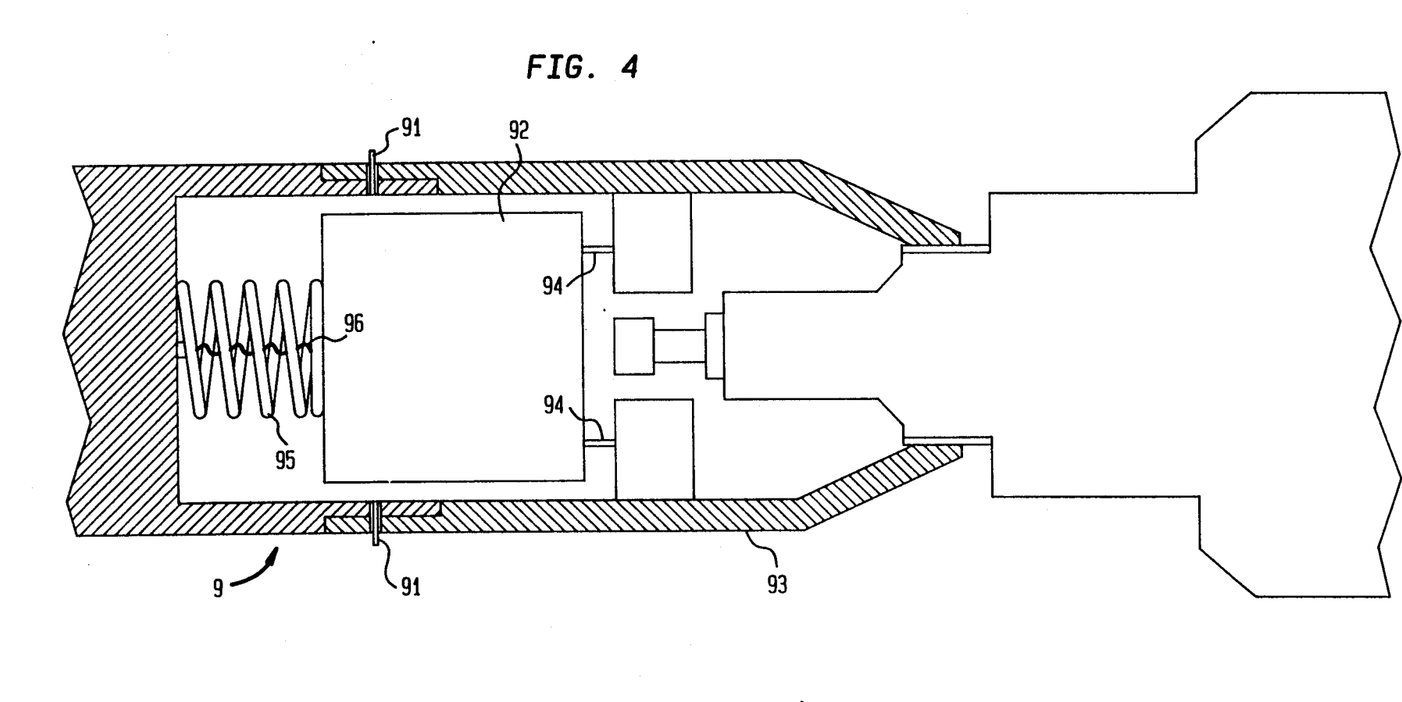
FIG. 4 is a sectional elevation view of an embodiment showing a rocket attachment and braking chute storage compartment.

The projectile could also be rocket launched, being attached to a rocket (9) such as a 2.75 inch rocket, as shown in FIG. 4. Due to the velocities attained by such rockets, shear pins (91) are provided to detach the projectile from the rocket when the boost phase is completed at burnout using the differential drag on the rocket body in flight and a light spring (95) to cause the pins to shear. A braking parachute (92) is stowed at the rocket head end in the warhead adapter housing (93 and mechanically attached at (94). The shear pins (91) provide a positive attachment between the rocket and the warhead during storage and launch acceleration. The shear pins are sheared and the drag chute is released on detachment of the rocket body after burnout by differential drag forces on the rocket body. The drag chute is initially deployed by a chute deployment lanyard (96) attached to the rocket body, which can be released at any time. The shear pins (91) are only one conventional form of temporary means for securing the warhead to the rocket during a portion of the flight path. Alternatives (not shown) include sabot-mounted pins which are extracted at launch by safety wires connecting the pins to the launcher and pins which are pulled out from inside the rocket assembly by inertially-operated weights or the like.

Figure 6:
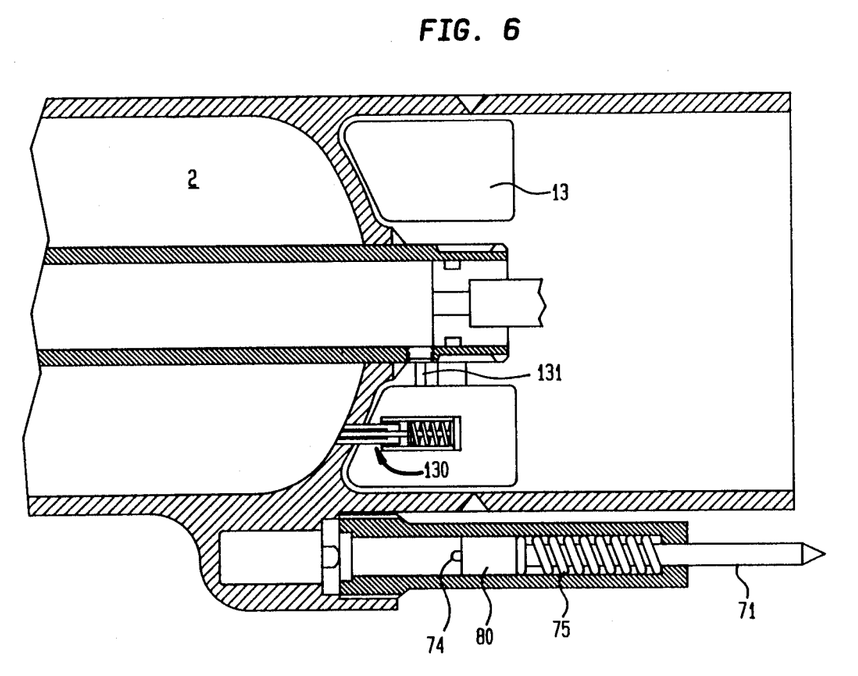
FIG. 6 and 6A are sectional elevation views showing an agent reservoir for injection into the target spaces after lance penetration.

The first part of the projectile to contact the target are the cartridge-driven studs (71), contained in stud assemblies (7) which are preferably spaced uniformly about the projectile's circumference as shown in FIGS. 1 and 1C. These are actuated by impact primers (72) which are struck by the striker (74) at the rear of the studs and ignite the cartridge propellant (73). The studs can be held in position during storage and flight by light springs (75). The function of the studs is to drive into the target surface, holding the lance in place. The studs firing also provide a retro thrust to the projectile and lance to soften the contact of the lance igniter with the target surface during impact. Alternatively, the studs can be driven by inertial weights or gas pressure. A collapsible tube (15) attached to the body of the projectile assembly also reduces the impact of the projectile and lance on the target surface. For clarity, only one stud is shown in FIGS. 1 and 6.

These cartridge-driven studs can be replaced by various attachment means suitable to hold the weapon on the target's surface at least long enough for the desired degree of penetration to be attained. These alternative attachment means should be considered as replacing the stud assemblies (7) schematically. For example, small permanent magnets can be used which fasten on impact with a ferrous surface, and small electromagnets can be used if energized by impact-actuated power units. Flexible permanent magnets can be made from composites containing ferromagnetic powders and elastomeric polymers which are shaped by pouring, casting, extrusion or other suitable means and cured under a strong magnetic field. Fast-setting adhesives can be used, which can be activated by combining at least one active ingredient with another ingredient or catalyst at impact (as, for instance, with epoxies and other rapid-curing adhesives), by thermal melting upon impact, or other suitable means. Strong, tacky pressure-sensitive adhesive patches can also be used. Such adhesive materials are commercially available from the 3M Company of St. Paul, MN and comparable manufacturers. Thermal welding can be used to fasten the projectile to metallic surfaces if portions of thermite (15a) and impact-actuated igniters (15b) are placed on appropriate points of impact, e.g. along the contacting surface of collapsible tube (15).

Figure 1F:
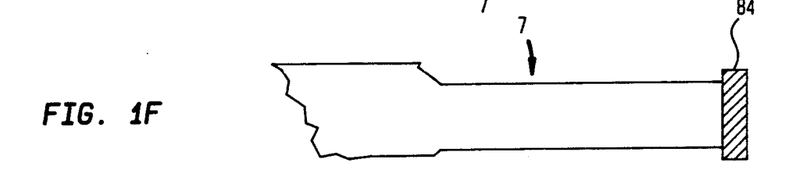

These features are illustrated schematically in FIG. 1F, wherein component (84) replaces the studs (71) in stud assemblies (7) and can be a permanent magnet or electromagnet. The electromagnets, when used, are energized by launch-actuated power units. Contact with a ferrous or ferromagnetic surface complete the magnetic circuit and ensures attachment of the weapon to the target surface. In FIG. 1F, component (84) can alternatively be an adhesive component which can be activated chemically or thermally upon impact, or can be a pressure-sensitive adhesive patch which is activated or uncovered prior to launch.

Figure 2A:
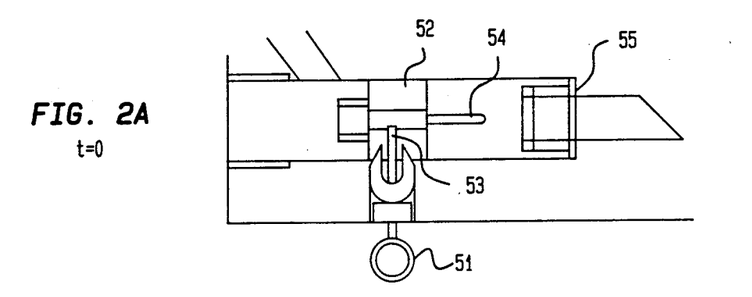
FIGS. 2A-2D provide sectional views of a portion of the oxidant control system illustrating the oxidant release sequence and enlarged views of the oxygen release striker and mechanical safety lock.
Figure 2B:
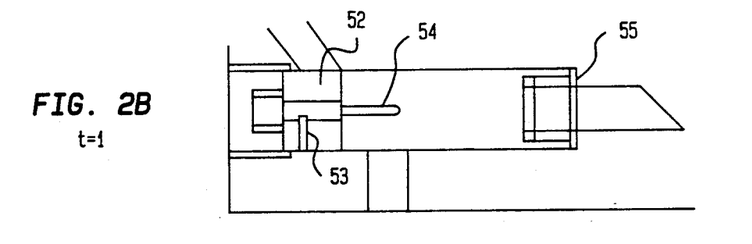
Figure 2C:
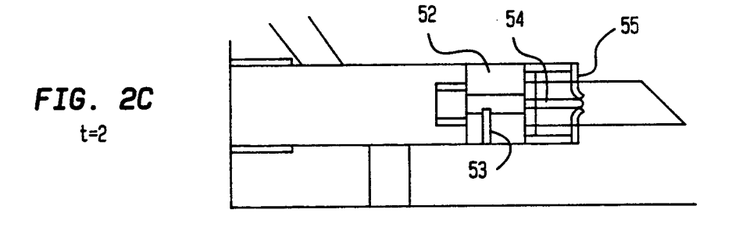
Figure 2D:
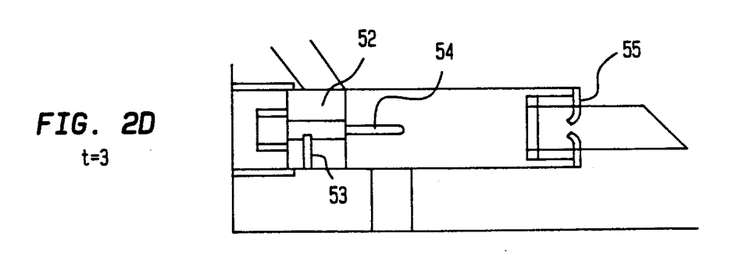

The oxidant release assembly (20) is outlined in FIG. 1. The oxidant valve holding pin (51), shown in FIGS. 1 and 2A, is removed mechanically before launch of the weapon. The oxidant release valve (52) is enabled by the setback forces of launch which shear a containment pin (53) and is opened when the missile impacts with the target, forcing the oxidant valve striker (54) to penetrate the burst diaphragm (55). The oxidant release sequence is illustrated in FIGS. 2A, 2B, 2C and 2D, progressing from time $t_0$ (pre-launch) to $t_3$ (post-impact) when the oxidant is released. The setback of oxygen valve striker (54) at launch is followed by rupture of burst diaphragm (55) at impact and the subsequent flow of oxidant.

As seen in FIG. 1, the oxidant flows through a tube (21) (see FIG. 1A) past the ruptured diaphragm (not shown) and connecting tubes (22) and (23) into a pressure regulating system (region 3) which reduces and regulates the pressure and the flow of the oxidant into the thermal lance. The pressure should be less than 80 psig, producing a flow rate of about 0.2 to 1.5 ft³/sec. at standard temperature and pressure. The flow of the high pressure oxidant to the rear of the weapon provides an impulsive force tending to keep the lance in place against the target surface during combustion. Typically, this force is 10 to 50 pounds. The differential pressure between the rear of the lance and the front keeps the burning end pressed against the target's surface to ensure effective penetration as both the target wall and lance materials are consumed. The pressure regulator can be any suitable system such as the pressure reducing regulators manufactured by Tescom Corporation's Pressure Controls Division of Elk River, MN. The flow of oxidant past the pressure regulator valve and into the lance is indicated by arrows. For a ½ inch pipe lance, oxygen consumption could be approximately 0.33 cubic feet per second at standard temperature and pressure.

The igniter (4) in FIG. 1 is actuated by impact with the target. It comprises an impact primer (41) and an ignition train made up of a flash composition (42) and a thermite mixture (43) such as B19L. The impact primer ignites the flash composition, which ignites the thermite mixture, which in turn ignites the thermal lance when the flow of oxidant starts. The flash composition is typically compounded of 10 parts of aluminum powder, 10 parts of magnesium powder, 60 parts of potassium nitrate and 5 parts of an organic binder such as vistanex. The B19L thermite mixture typically contains 4 parts of barium nitrate, 75 parts of iron oxide, 25 parts of aluminum flake and 10 parts of Mg/Al powder.

As discussed above, the igniter (4) for the thermal lance can optionally be actuated by timer or remote signal. These options are illustrated schematically in FIG. 1 by component (45) which includes a primer equivalent to (41) to ignite flash composition (42) and a timer and/or a sensor to receive a remote signal (46) via wire, optical fiber or waveguide, or the atmosphere. Such a signal can be electrical, visible or infrared light, or other electromagnetic energy in, e.g. the radio or microwave frequency range. Similarly, the oxidant can be released by actuator (26), which incorporates a timer and/or sensor and suitable means to burst diaphragm (55) or otherwise release the oxidant. A variety of mechanical, electrical and pyrotechnic devices are available to perform this function.

FIG. 6 shows an agent reservoir (13) attached to an anti-armor projectile. In this case, the agent reservoir is pressurized by the oxidant pressure when the oxidant reservoir falls to some minimum, e.g. 50 psig. At that pressure the agent pressurization valve (130) opens, permitting the oxidant reservoir to pressurize the agent reservoir. Agent is released into the spent thermal lance when the lance holder actuates the agent vent valve (131) by sliding over it, thus forcing agent through the lance into the target's interior.

Figure 6A:
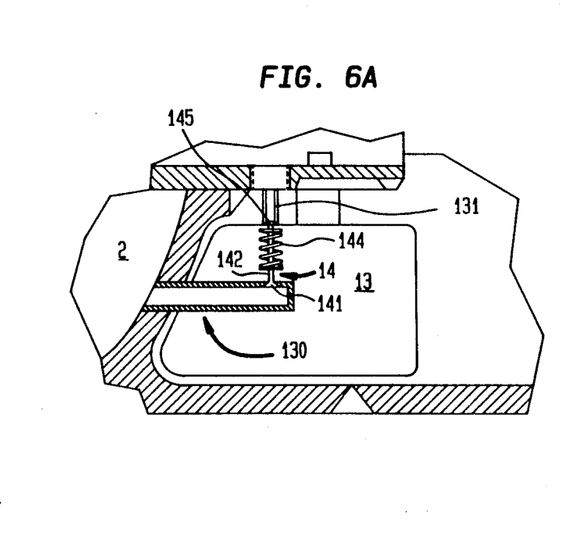

FIG. 6A shows a more elegant system for pressurizing and releasing the agent by employing a double-ended spring-loaded valve assembly (14). Valve (141) at one end of valve stem (142) is exposed to oxidant pressure through tube (130). When the oxidant pressure falls below the set level, spring (144) opens valve (141) against the reduced oxidant pressure, allowing oxidant to enter agent reservoir (13) to pressurize it. At the same time, agent valve (145) at the opposite end of the valve stem opens, allowing agent to escape through tube (131) into the spent thermal lance and thence into the target. As with the system described above, the lance holder (10) slides by the agent reservoir valve at impact so that it can be actuated.

Figure 5:
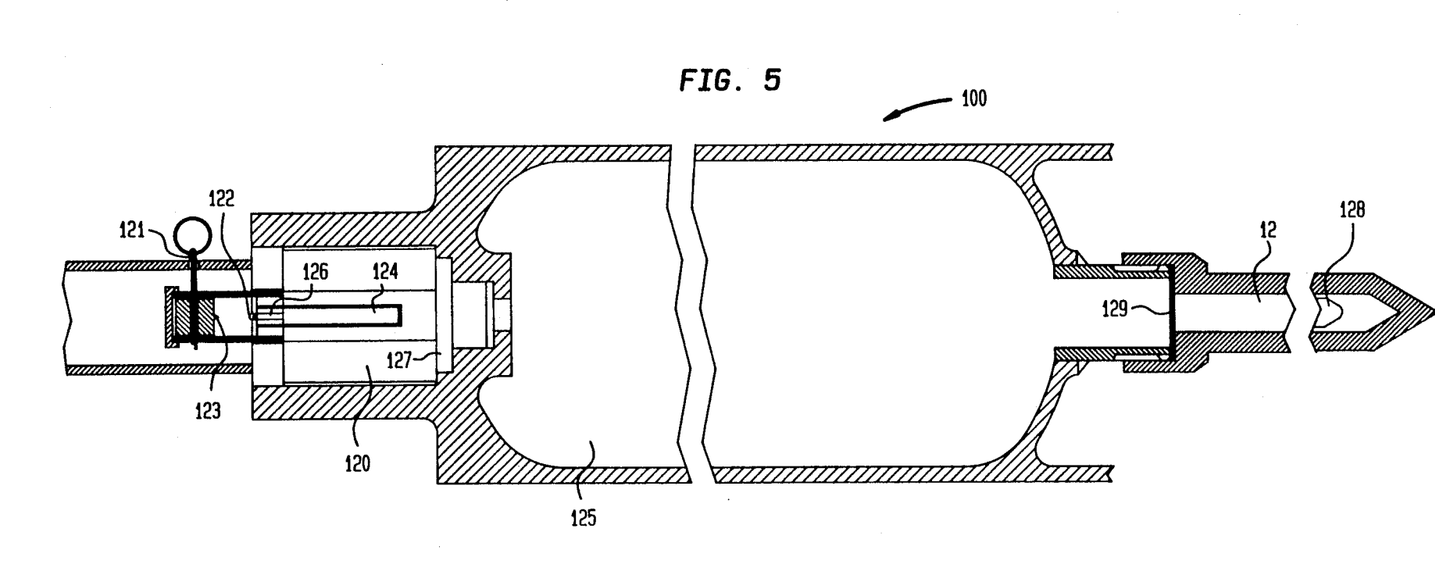
FIG. 5 is a sectional elevation view of an embodiment in which the fastening and penetration means are combined in the form of a hollow bayonet.

In the case of a light armored or unarmored target, as shown in FIG. 5, the thermal lance in projectile body (!00) is replaced by a rigid hollow perforated bayonet (12) having vent slits (128) and capable of penetrating relatively thin walls or light armor by impact. A gas generator (120) replaces the pressure regulator in the anti-armor projectile. This warhead is provided with fins (not shown) similar to those used on the antiarmor projectile. A mechanical safety pin (121) is used to prevent premature movement of the impact driven striker (123). The safety pin is removed just prior to launch. On impact with the target, this striker is driven into the impact primer (122), igniting the gas generator ignition delay train (126) which in turn ignites the gas generator igniter (124). When sufficient pressure is attained in the gas generator, the gas generator burst diaphram (127) ruptures, pressurizing the agent reservoir (125). This pressurization causes the reservoir burst diaphram (129) to rupture, expelling the reservoir's contents through the perforated penetrating bayonet (12) having slits (128) into the target's interior.

It must be emphasized that the various components of the weapons described above are of proven reliability and effectiveness and can readily be assembled into operational weapons as described herein. The present invention is directed to the assembly of these various known components into novel assemblies which are simple but effective in achieving their declared purposes.

Numerous modifications and variations of the present invention are possible in the light of the above teachings. It must be therefore understood that the invention may be practiced in manners other than as specifically described, and the scope of the invention is limited only by the appended claims.

What is claimed is:

1. A launchable assault weapon adapted to penetrate armored targets by burning with a thermal lance, comprising a launchable body, impact-actuated fastening means comprising cartridge-driven studs, a thermal lance capable of burning through the target's armor, impact-actuated igniter means for said lance, an oxidant source and impact-actuated means to trigger the flow of said oxidant, wherein said fastening means are adapted to hold said weapon in position for a period of time at least sufficient to burn through said armor.

2. The weapon of claim 1 wherein said fastening means comprise means for at least partially welding said weapon to said target.

3. The weapon of claim 1 wherein said oxidant comprises oxygen.

4. The weapon of claim 1 wherein said oxidant when triggered has a flow path which is directed so that pressure is exerted on the base of said lance to press said lance against the target surface during the flow of said oxidant.

5. The weapon of claim 1, further comprising at least one set of stabilizing fins attached to said body.

6. The weapon of claim 5 wherein said stabilizing fins are selected from the group consisting of fixed, folding and wraparound fins.

7. The weapon of claim 1 which comprises shock-absorbing means attached to said body which actuate upon impact of the weapon.

8. The weapon of claim 7 wherein said shock absorbing means comprise at least one component which collapses upon impact with a target to reduce the impact of the weapon upon the target's surface.

9. A non-explosive penetrating weapon adapted to be fastened to armored targets and to penetrate said targets by burning with a thermal lance, comprising means for fastening said weapon to said target, a thermal lance capable of burning through the armor of said targets, igniter means for said lance, an oxidant source and means to trigger the flow of said oxidant, wherein said fastening means are adapted to hold said weapon in position for a period of time at least sufficient to burn through said armor and the means to trigger the flow of said oxidant and ignite said lance comprise at least one of timing means and remote signal means.

* * * * *